(12) United States Patent
Bize et al.

(10) Patent No.: US 11,982,144 B2
(45) Date of Patent: May 14, 2024

(54) METHOD AND SYSTEM FOR GENERATING A VIRTUAL CORE

(71) Applicant: Schlumberger Technology Corporation, Sugar Land, TX (US)

(72) Inventors: Emmanuel Bize, Creancey (FR); Nadege Bize-Forest, Rio de Janeiro (BR); Isabelle Le Nir, Paris (FR); Robert J. Laronga, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 525 days.

(21) Appl. No.: 15/747,107

(22) PCT Filed: Jul. 27, 2016

(86) PCT No.: PCT/US2016/044150
§ 371 (c)(1),
(2) Date: Jan. 23, 2018

(87) PCT Pub. No.: WO2017/019718
PCT Pub. Date: Feb. 2, 2017

(65) Prior Publication Data
US 2018/0225868 A1    Aug. 9, 2018

Related U.S. Application Data

(60) Provisional application No. 62/197,917, filed on Jul. 28, 2015.

(51) Int. Cl.
*E21B 47/00* (2012.01)
*E21B 25/00* (2006.01)
(Continued)

(52) U.S. Cl.
CPC .............. *E21B 25/00* (2013.01); *E21B 47/00* (2013.01); *E21B 47/0025* (2020.05);
(Continued)

(58) Field of Classification Search
CPC ....... G06T 17/05; E21B 47/002; E21B 47/00; E21B 25/00; E21B 47/022; E21B 49/06;
(Continued)

(56) References Cited

U.S. PATENT DOCUMENTS 9,563,963 B2 * 2/2017 Elkington ................. G01V 1/42
2003/0074139 A1 * 4/2003 Poedjono ................. G01V 1/44
702/16

(Continued)

FOREIGN PATENT DOCUMENTS

CA          2869825 A1 *   11/2013  ............. G01V 1/306
WO      2009/126881 A2    10/2009
WO    WO-2009126881 A2 *  10/2009  ............. E21B 47/00

OTHER PUBLICATIONS

Duguid, Andrew, et al. "Pre-injection baseline data collection to establish existing wellbore leakage properties." Energy Procedia 37 (2013): 5661-5672. (Year: 2013).*

(Continued)

*Primary Examiner* — Michael Edward Cocchi
(74) *Attorney, Agent, or Firm* — Jeffrey D. Frantz

(57) ABSTRACT

Generating a virtual core includes obtaining acquired data for a region of interest, determining a rock type of the region of interest, obtaining a selection of modules based on the rock type, and generating, using the acquired data and an interpolator from the modules, a wellbore image of the region of interest. The interpolator generates interpolated data between data points among the acquired data in the wellbore image. Further, using a quantifier from the plurality of modules, a core characterization of the region of interest is determined. The core characterization describes an integration of wellbore data types. Using the core characterization and the wellbore image, a digital core construction of the region of interest is generated. The digital core construc-
(Continued)

tion describes subterranean formation properties of the region of interest.

26 Claims, 10 Drawing Sheets

(51) Int. Cl.
*E21B 47/002* (2012.01)
*E21B 47/022* (2012.01)
*G01V 99/00* (2009.01)
*G06T 17/05* (2011.01)

(52) U.S. Cl.
CPC .......... *E21B 47/022* (2013.01); *G01V 99/005* (2013.01); *G06T 17/05* (2013.01)

(58) Field of Classification Search
CPC . E21B 47/006; E21B 47/0025; G01V 99/005; G06K 9/3233; G06V 10/25; G06V 30/147; G06F 30/25; G06F 30/27; G06F 30/28
See application file for complete search history.

(56) References Cited

U.S. PATENT DOCUMENTS

| | | |
|---|---|---|
| 2004/0204857 A1 | 10/2004 | Ramamoorthy et al. |
| 2007/0239359 A1 | 10/2007 | Stelting et al. |
| 2009/0045856 A1 | 2/2009 | Spirkl et al. |
| 2009/0093961 A1 | 4/2009 | Valero et al. |
| 2009/0259446 A1* | 10/2009 | Zhang ................ G06F 30/20 703/2 |
| 2009/0260415 A1 | 10/2009 | Suarez-Rivera et al. |
| 2010/0198569 A1 | 8/2010 | Wu et al. |
| 2011/0004447 A1* | 1/2011 | Hurley ................ G06T 17/00 702/179 |
| 2012/0221306 A1* | 8/2012 | Hurley ................ G01V 99/005 703/6 |
| 2012/0316789 A1* | 12/2012 | Suarez-Rivera ......... G01V 9/00 702/13 |
| 2013/0063433 A1* | 3/2013 | Lin .................... G01V 3/38 345/442 |
| 2013/0110486 A1 | 5/2013 | Polyakov et al. |
| 2013/0132052 A1* | 5/2013 | Hogg ................... G06T 17/05 703/6 |
| 2015/0279093 A1* | 10/2015 | Sung ................... E21B 47/0025 345/419 |

OTHER PUBLICATIONS

Zhang, Tuanfeng, et al. "3D porosity modeling of a carbonate reservoir using continuous multiple-point statistics simulation." SPE Journal 11.03 (2006): 375-379. (Year: 2006).*
International Preliminary Report on Patentability for the equivalent International patent application PCT/US2016/044150 dated Feb. 8, 2018.
Extended Search Report for the equivalent European patent application 16831257.7 dated Mar. 20, 2019.
Communication pursuant to Article 94(3) for the European patent application 16831257.7 dated Apr. 3, 2020.
Zhang, "Filter-Based Training Pattern Classification for Spatial Pattern Simulation," 2006 Ph.D. dissertation at Stanford Jniversity.
International Search Report and Written Opinion for the equivalent International patent application PCT/US2016/044150 dated Oct. 28, 2016.

* cited by examiner

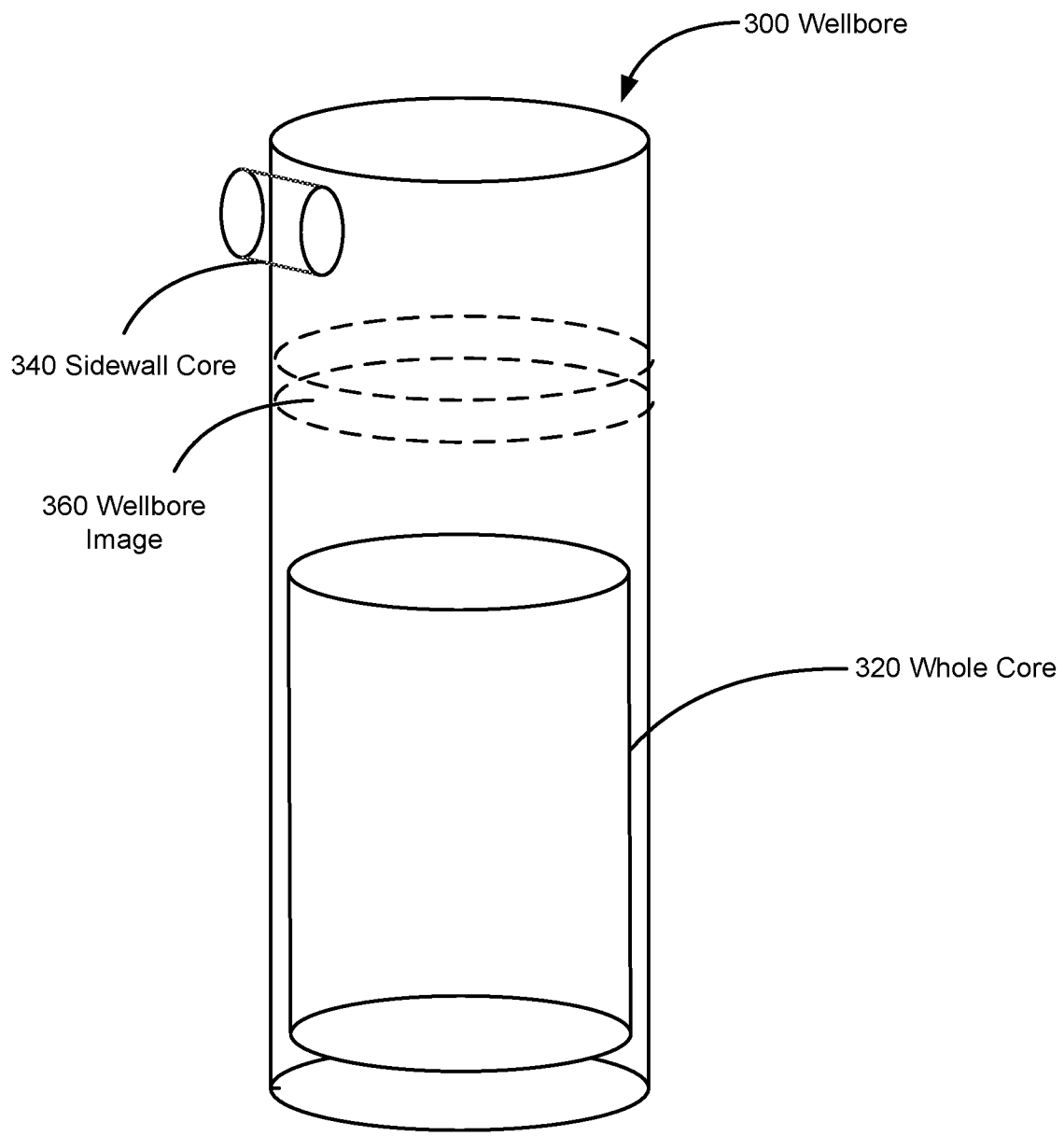
FIG. 3.1

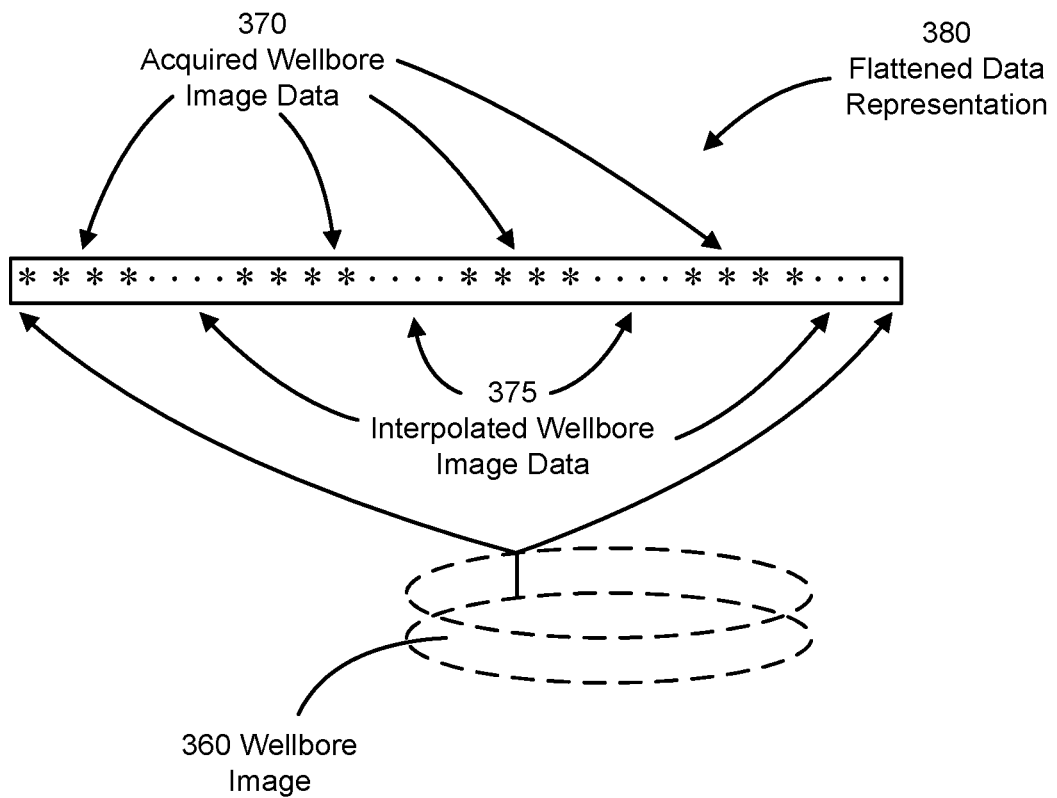
FIG. 3.2

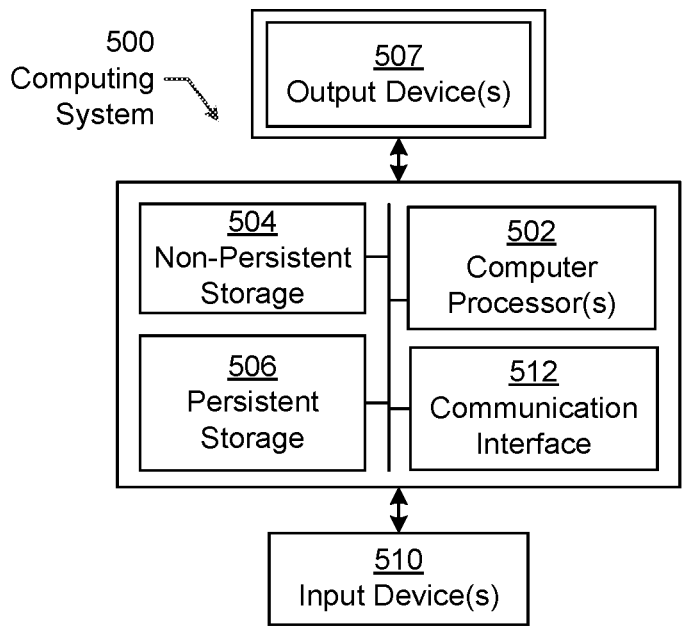
FIG. 5.1
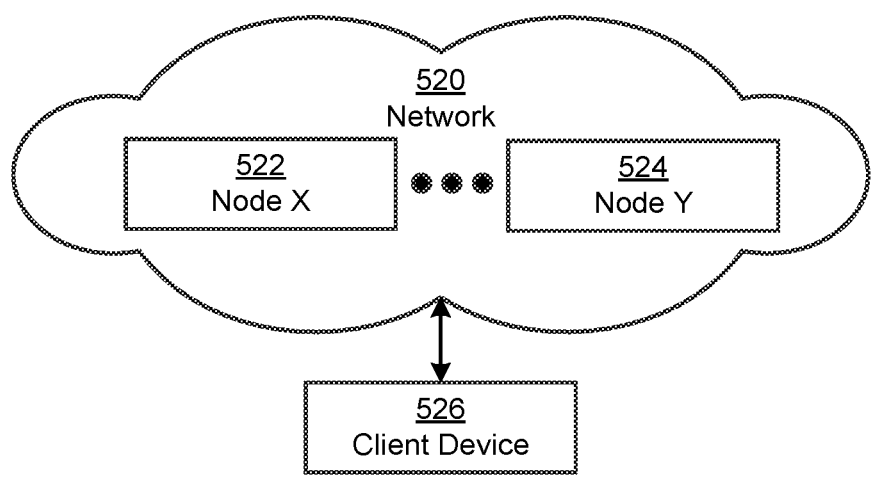
FIG. 5.2

METHOD AND SYSTEM FOR GENERATING A VIRTUAL CORE

CROSS-REFERENCE TO RELATED APPLICATIONS

This application is a National Stage Entry of International Application No. PCT/US2016/044150, which was filed Jul. 27, 2016, which claims priority to U.S. Provisional Patent Application No. 62/197,917, which was filed on Jul. 28, 2015, and is incorporated herein by reference.

BACKGROUND

Fluids, both liquids and gases, may be found in subterranean reservoirs and may be accessed by drilling a well. The drilling process may produce a wellbore, also known as a borehole, that may be a source of valuable information about the subterranean formation through which it passes. Multiple techniques of acquiring downhole information exist, including logging tools, both wireline and logging while drilling (LWD), as well as coring.

SUMMARY

In general, in one aspect, one or more embodiments relate to generating a virtual core including obtaining acquired data for a region of interest, determining a rock type of the region of interest, obtaining a selection of modules based on the rock type, and generating, using the acquired data and an interpolator from the modules, a wellbore image of the region of interest. The interpolator generates interpolated data between data points among the acquired data in the wellbore image. Further, using a quantifier from the plurality of modules, a core characterization of the region of interest is determined. The core characterization describes an integration of wellbore data types. Using the core characterization and the wellbore image, a digital core construction of the region of interest is generated. The digital core construction describes subterranean formation properties of the region of interest.

Other aspects of the technology will be apparent from the following description and the appended claims.

BRIEF DESCRIPTION OF DRAWINGS

Certain embodiments of the disclosure will hereafter be described with reference to the accompanying drawings, where like reference numerals denote like elements. It should be understood, however, that the accompanying figures illustrate the various implementations described herein and are not meant to limit the scope of various technologies described herein.

FIGS. 3.1 and 3.2 show embodiments of coring technology and wellbore imaging.

FIGS. 5.1 and 5.2 show a computing system in accordance with one or more embodiments of the technology.

DETAILED DESCRIPTION

Figure 1:
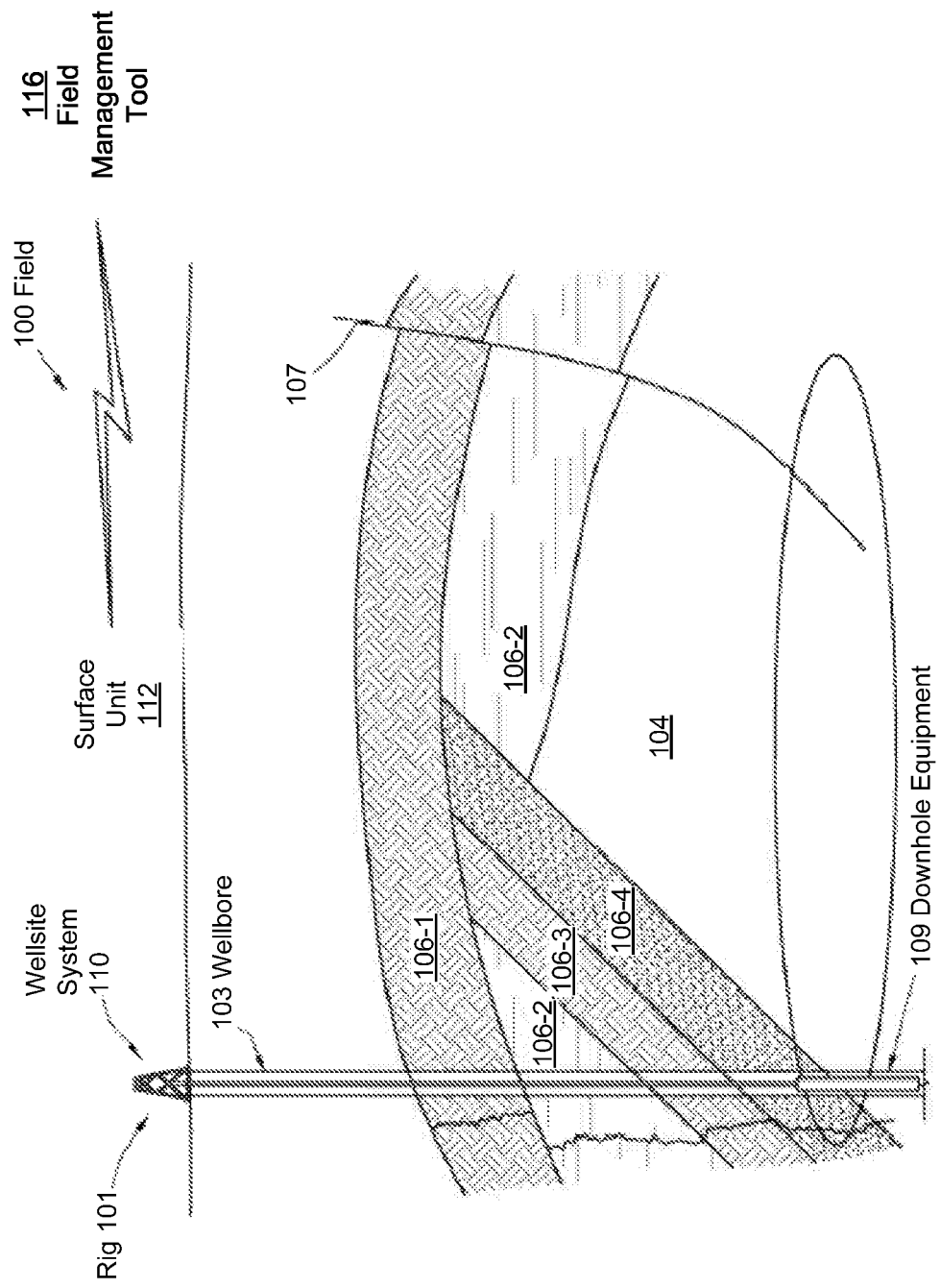
FIGS. 1 and 2 show schematic diagrams in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology include a method, a system, and a non-transitory computer readable medium for providing information similar to that obtained by the examination of conventional whole core by techniques other than whole core. These techniques may include well logging measurements and sidewall core. The method includes obtaining acquired data for a region of interest, determining a rock type of the region of interest, obtaining a selection of a plurality of modules based on the rock type, generating a wellbore image of the region of interest, determining a core characterization of the region of interest, and generating a digital core construction of the region of interest. The interpolator includes one or more modules that may include hardware and/or software and generates interpolated data between data points among the acquired data in the wellbore image. The quantifier includes one or more modules that may include hardware and/or software. The core characterization describes an integration of a plurality of wellbore data types. The digital core construction describes a plurality of subterranean formation properties of the region of interest. The system may be used to implement the method, and the non-transitory computer readable medium may store instructions for connecting a plurality of networks. The instructions, when executed by a computer processor include functionality to perform the method.

FIG. 1 depicts a schematic view, partially in cross section, of a field (100) in which one or more embodiments may be implemented. In one or more embodiments, the field may be an oilfield. In other embodiments, the field may be a different type of field. In one or more embodiments, one or more of the modules and elements shown in FIG. 1 may be omitted, repeated, and/or substituted. Accordingly, embodiments should not be considered limited to the specific arrangements of modules shown in FIG. 1.

As shown in FIG. 1, the subterranean formation (104) may include several geological structures (106-1 through 106-4) of which FIG. 1 provides an example. As shown, the formation may include a sandstone layer (106-1), a limestone layer (106-2), a shale layer (106-3), and a sand layer (106-4). A fault line (107) may extend through the formation. In one or more embodiments, various survey tools and/or data acquisition tools are adapted to measure the formation and detect the characteristics of the geological structures of the formation. Further, as shown in FIG. 1, the wellsite system (110) is associated with a rig (101), a wellbore (103), and other field equipment and is configured to perform wellbore operations, such as logging, drilling, fracturing, production, or other applicable operations. The wellbore (103) may also be referred to as a borehole.

In one or more embodiments, the surface unit (112) is operatively coupled to a field management tool (116) and/or the wellsite system (110). In particular, the surface unit (112) is configured to communicate with the field management tool (116) and/or the wellsite system (110) to send commands to the field management tool (116) and/or the wellsite system (110) and to receive data therefrom. For example, the wellsite system (110) may be adapted for measuring downhole properties using logging-while-drilling ("LWD") tools to obtain well logs and for obtaining core samples. In one or more embodiments, the surface unit (112) may be located at the wellsite system (110) and/or remote locations. The surface unit (112) may be provided with computer facilities for receiving, storing, processing, and/or analyzing data from the field management tool (116), the wellsite system (110), or another part of the field (100). The field management tool (116) may be similar to the computer described in FIGS. 5.1 and 5.2 and the accompanying description. The surface unit (112) may also be provided with or include functionally for actuating mechanisms at the field (100). The surface unit (112) may then send command signals to the field (100) in response to data received, for example, to control and/or optimize various field operations described above.

During the various oilfield operations at the field, data is collected for analysis and/or monitoring of the oilfield operations. Such data may include, for example, subterranean formation, equipment, historical and/or other data. Static data relates to, for example, formation structure and geological stratigraphy that define the geological structures of the subterranean formation. Static data may also include data about the wellbore, such as inside diameters, outside diameters, and depths. Dynamic data relates to, for example, fluids flowing through the geologic structures of the subterranean formation over time. The dynamic data may include, for example, pressures, fluid compositions (e.g., gas oil ratio, water cut, and/or other fluid compositional information), choke positions of downhole flow control valves, and other information that may be monitored via downhole equipment (109) such as downhole sensors. The downhole sensors may include sensors which are part of the downhole flow control valves and sensors, e.g. pressure and temperature sensors, which are located separately in the various well zones and/or other well locations.

The static and dynamic data collected from the wellbore and the oilfield may be used to create and update a three dimensional (3D) model of the subterranean formation. Additionally, static and dynamic data from other wellbores or oilfields may be used to create and update the three dimensional model. Hardware sensors, core sampling, and well logging techniques may be used to collect the data. Other static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once the well is formed and completed, fluid flows to the surface using production tubing and other completion equipment. As fluid passes to the surface, various dynamic measurements such as fluid flow rates, pressure, and composition may be monitored. These parameters may be used to determine various characteristics of the subterranean formation.

In one or more embodiments, the data is received by the surface unit (112), which is communicatively coupled to the field management tool (116). Generally, the field management tool (116) is configured to analyze, model, control, optimize, or perform other management tasks of the aforementioned field operations based on the data provided from the surface unit (112). Although the surface unit (112) is shown as separate from the field management tool (116) in FIG. 1, in other examples, the surface unit (112) and the field management tool (116) may also be combined.

In the vertical well shown in FIG. 1, a lateral of the vertical well is the wellbore. Although FIG. 1 shows a vertical well, one or more embodiments may apply to a deviated well and/or a multilateral well that extends in a non-vertical orientation through one or more subsurface formations. For example, in a deviated well, the lateral may correspond to the single wellbore trajectory. The single lateral of the deviated or vertical well may have multiple zones isolated by packers and downhole flow control valves. In a multilateral well, multiple laterals may exist. A horizontal well is one type of deviated well.

Figure 2:
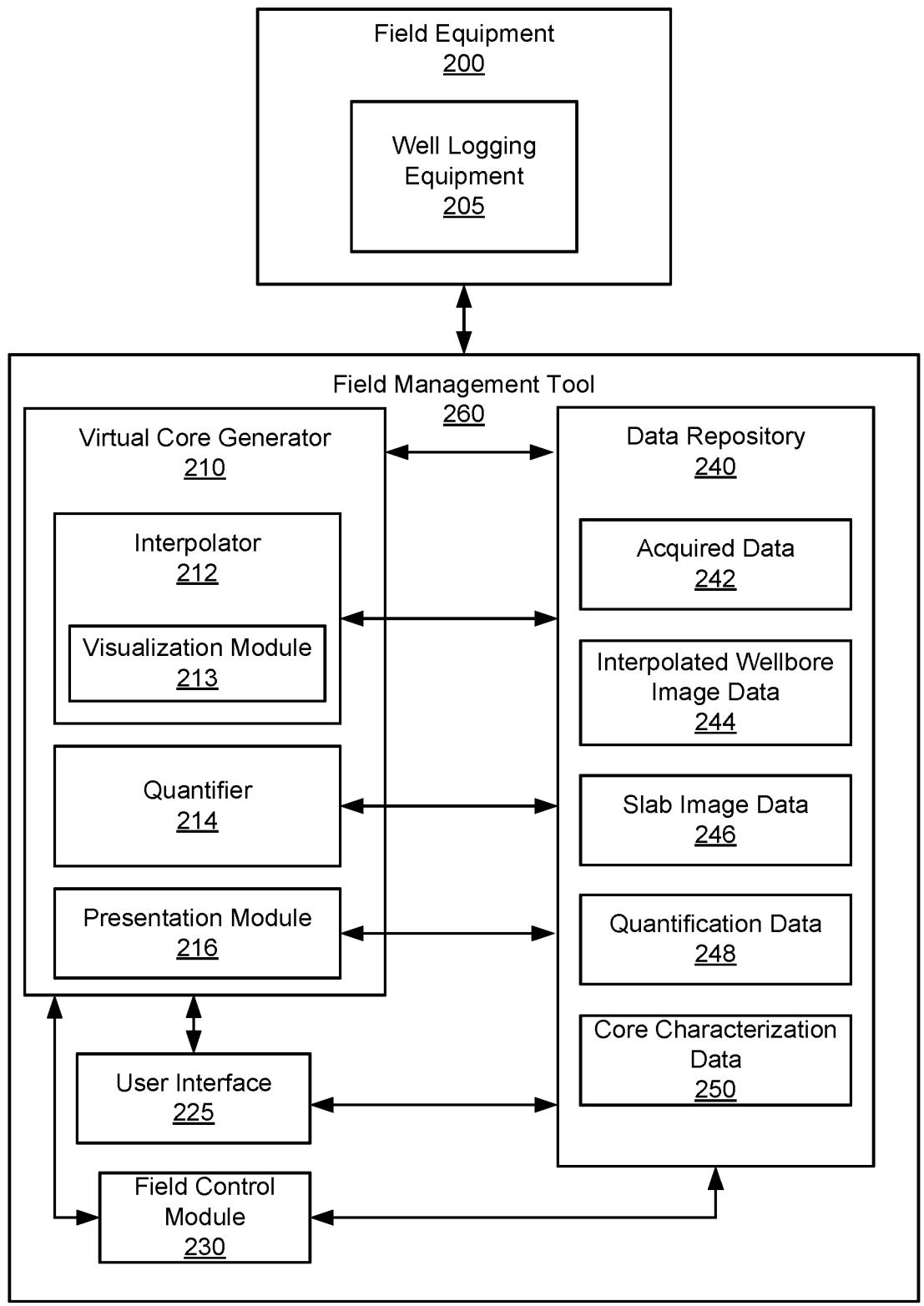

FIG. 2 shows a schematic diagram of a system in accordance with one or more embodiments of the technology. In FIG. 2, lines represent operable connections between components. In other words, the operable connections represent at least some of the components that may share data and commands. The operable connections may be direct or indirect, through a network, through shared storage, through application programming interface calls, intermittent or semi-permanent, or through any other type of connection.

As shown in FIG. 2, field equipment (200) is operatively connected to a field management tool (260). In one or more embodiments, the field management tool (260) may be a well data analysis tool. The field equipment (200) may correspond to any of the hardware and other equipment discussed above with reference to FIG. 1 and may include well logging equipment (205), some of which may be a type of downhole equipment (109). The field management tool (260) may correspond to the field management tool discussed above with reference to FIG. 1. While the field management tool (260) is described in use with various activities relating to drilling in FIG. 1, the field management tool (260) may further be used with respect to various activities in preparation to drilling, e.g., surveying a possible wellsite. Thus, the field management tool (260) may be used with respect to activities performed prior to actual drilling.

In one or more embodiments of the technology, well logging equipment (205) is used to make measurements of a subterranean formation. Well logging equipment (205) may also be known as well logging tools. Well logging equipment (205) may include devices to measure spontaneous potential. Spontaneous potential is an electrical potential difference between an electrode on a well logging tool and a grounded electrode at the surface. Other well logging equipment (205) may measure naturally occurring gamma radiation. This may include spectral gamma ray logs where gamma rays are attributed to gamma ray sources, for example, potassium, thorium, and uranium, among others.

Electrical resistivity may also be measured by well logging equipment (205), including induction logging tools. Well logging equipment (205) may also be used to measure density, for example, by emitting and detecting gamma rays. Another well logging tool may emit and detect neutrons, while others may record acoustic signals, including those that measure ultrasonic frequencies. Other well logging equipment (205) may record a nuclear magnetic resonance response from its environment. Yet another well logging tool may emit neutrons and measure gamma ray intensity as a function of energy, which may be known as neutron-induced gamma ray spectroscopy. Wellbore imaging devices, including those based on electrical properties, for example, resistivity, and electromagnetic, and those based on acoustic properties, for example, ultrasonic, may be included in well logging equipment (205). Sidewall core sampling devices that remove sample material from a subterranean formation by drilling into the wellbore wall may also be included in well logging equipment (205).

As shown in FIG. 2, the field management tool 260 includes a virtual core generator (210), a user interface (225), a field control module (230), and a data repository (240). Each of these components is described below.

In one or more embodiments, the virtual core generator (210) corresponds to hardware, software, firmware, or a combination thereof that includes functionality to generate from acquired data (242) a representation of a whole core and/or an analysis thereof. Whole core is created as the well is drilled with a special coring bit and is slightly smaller in diameter than the diameter of the wellbore. Conventional whole core is a cylindrical sample of a portion of a subterranean formation and may be created during a coring operation with a special coring drill bit used in conjunction with a core barrel and a core catcher. The whole core is generally coaxial with the wellbore. In one or more embodiments, the virtual core generator (210) includes an interpolator (212). In one or more embodiments, the interpolator (212) includes one or more modules that may include hardware and/or software. For example, the interpolator (212) may take acquired data (242) and generate interpolated data interspersed at one or more locations between the acquired data (242). In one or more embodiments, the acquired data (242) may be wellbore image data, also known as borehole image data.

In one or more embodiments, the interpolator (212) uses a statistical approach to generate the interpolated data. In one or more embodiments, the interpolator (212) takes wellbore image data that has been acquired in a wellbore and generates interpolated data located between the acquired data (242). In one or more embodiments, the statistical approach to generate interpolated data is derived from multiple-point statistics (MPS) theory. MPS is a facies modeling technique, another approach to categorical geostatistics that uses a training image to estimate the conditional probability at an interpolation location given acquired and already interpolated data. In one or more embodiments, the statistical approach derived from MPS theory is described in "Filter-Based Training Pattern Classification for Spatial Pattern Simulation," the 2006 Ph.D. dissertation of Tuanfeng Zhang at Stanford University.

In one or more embodiments, the wellbore image data is acquired data (242) that is measured by a pad-type logging tool where the pad is effectively in contact with the wellbore wall. In one or more embodiments, the pad-type tool includes a plurality of pads with a plurality of sensors on each pad. In some wellbore environments, the plurality of pads in contact with the wellbore wall may not provide complete circumferential coverage of the wellbore wall. In one or more embodiments, the interpolator (212) may be used to generate interpolated data for portions of the wellbore wall that were not directly measured by one of the pads in a pad-type logging tool.

In one or more embodiments, the acquired data is measured by a wellbore imaging tool operating in a water-base mud (WBM) wellbore environment. In one or more embodiments, the acquired data is measured by a wellbore imaging tool operating in an oil-base mud (OBM) wellbore environment. In one or more embodiments, the acquired data is measured by a wellbore imaging tool operating in a synthetic-base mud (SBM) wellbore environment. In one or more embodiments, the acquired data is measured by a wellbore imaging tool operating in a wellbore environment that is not characterized as WBM, OBM, or SBM.

In one or more embodiments, the acquired data with a predetermined sampling interval is measured by a resistivity-based wellbore imaging tool. The sampling interval is understood to be the distance between acquired data points measured in the circumferential direction around a wellbore wall by one pad of a pad-type tool. In one or more embodiments, the acquired data is measured by an ultrasound-based wellbore imaging tool.

In one or more embodiments, the interpolator (212) includes a visualization module (213). In one or more embodiments, the interpolator (212) generates interpolated wellbore image data (244). In one or more embodiments, the interpolated wellbore image data (244) generated by the interpolator (212) may cover substantially the entire wellbore wall at a given measured depth or within a given measured depth interval. Stated differently, the interpolated wellbore image data (244) covers substantially 360 degrees of the wellbore wall at a given measured depth and/or within a measured depth interval in a wellbore. There are multiple means of identifying location in a wellbore, measure depth being one of them. This 360 degree interpolated wellbore image data (244) may increase the delineation of texture and fracture, especially the automated processing of texture and fracture. An automated texture analysis may not be affected when the heterogeneities in the acquired data (242) are smaller than the pad width but becomes less robust when the size of the textural feature in the image exceeds the pad width. In one or more embodiments, the visualization module (213) may perform any of the functions described for the interpolator (212).

In one or more embodiments, the interpolator (212) uses acquired data (242) to generate slab image data (246). In one or more embodiments, the interpolator (212) uses interpolated wellbore image data (244) to generate slab image data (246). The interpolated wellbore image data (244) may be acquired, interpolated, or a combination thereof. Slab image data (246) describes a two-dimensional (2D) image of a slice transecting the interpolated wellbore image data (244) at two points at each measured depth included in the slab image data (246). In one or more embodiments, the interpolator (212) generates a geometrical reconstruction of a 2D image of a slice transecting the interpolated wellbore image data (244) at two points at each measured depth included in the slab image data (246). The 2D image may be similar to an image created photographically of a slice, or slab, of a whole core extracted from a well. The data created and presented by the virtual core generator (210) may cover the logged interval of a wellbore, whereas whole core is often over a much shorter measured depth interval.

Wellbore images derived from interpolated wellbore image data (244) may be used to identify many features of a subterranean formation including crossbedding, burrows, fine laminations, microfaults, grain size, bioturbation, and thin resistive fractures.

In one or more embodiments, the virtual core generator (210) includes a quantifier (214). In one or more embodiments, the quantifier (214) includes one or more modules that may include hardware and/or software. In one or more embodiments, the quantifier (214) generates quantification data (248) using one or more of the following data: acquired data (242), interpolated wellbore image data (244), slab image data (246). In one or more embodiments, the quantifier (214) performs textural analysis. In one or more embodiments, resistivity spectrum analysis, a type of resistivity spectrum characterization, is performed to generate textural analysis parameters. In one or more embodiments, the resistivity spectrum analysis analyzes resistivity distribution(s) from interpolated wellbore images through histogram and quantile analysis. In one or more embodiments, for example, a quantile analysis determines quantile values that may be used to generate an image sorting index. For example, the image sorting index may be defined as the result of dividing the difference between the $70^{th}$ percentile and the 30th percentile by the 50th percentile. The resistivity distribution in an image measured in a clastic formation may be related to textural parameters. In one or more embodiments, the image sorting index may have a relationship to grain size sorting.

In one or more embodiments, the quantifier (214) includes a heterogeneity analysis. Heterogeneity may be understood as the quality of variation in rock properties with location in a reservoir or subterranean formation. In one or more embodiments, the heterogeneity analysis provides such quantitative measures of reservoir behavior as heterogeneity index and vug porosity. In one or more embodiments, the heterogeneity analysis quantifies the spatial distribution of resistive and conductive zones and the connectivity of the zones to obtain a representation of the wellbore heterogeneity. In one or more embodiments, the results of the heterogeneity analysis are used in facies description and facies prediction. In one or more embodiments, facies prediction includes a classification of rock units by geological features. In one or more embodiments, the heterogeneity analysis removes the background conductivity of the interpolated wellbore image data. In one or more embodiments, the heterogeneity analysis uses a watershed transform to segment the interpolated wellbore image data with its background conductivity removed. In one or more embodiments, conductive and resistive zones of the segmented data are extracted using cutoffs.

In one or more embodiments, the quantifier (214) includes lithology analysis. In one or more embodiments, the lithology analysis combines interpolated wellbore image data (244) with other data acquired in well logging. In one or more embodiments, for example, the wellbore image data includes high-resolution data from a micro-resistivity imaging tool. In one or more embodiments, the other acquired data includes lithology data from a neutron-induced gamma ray spectroscopy tool. In one or more embodiments, the lithology data may include measurements of clay (WCLA), quartz-feldspar-mica (WQFM), and carbonate (WCAR), among others. In one or more embodiments, at least these three measurements may be used as the three endpoints in a ternary diagram giving at least 12 different lithology classes such as Marl, Claystone, Shale, Sandy Shale, Shale Sand, Sand, Clean Sand, Calcareous Sand, Calcareous Shale, Carbonate, Sandy Carbonate, and Shale Carbonate.

In one or more embodiments, the quantifier (214) includes using data derived from sidewall core to validate and calibrate other wellbore data (242, 244, 246, 248). In one or more embodiments, sidewall core is obtained with a large-volume rotary sidewall coring tool.

In one or more embodiments, the virtual core generator (210) includes a presentation module (216). In one or more embodiments, the presentation module (216) uses one or more of the following data types: acquired data (242), interpolated wellbore image data (244), slab image data (246), and quantification data (248) to generate core characterization data (250). In one or more embodiments, the presentation module (216) presents the core characterization data (250) in a core log format. In one or more embodiments, the core log format presents data as a function of measured depth. In one or more embodiments, the core log format presents data as a function of true vertical depth (TVD). Other techniques of identifying location along a wellbore may also be used.

Figure 8:
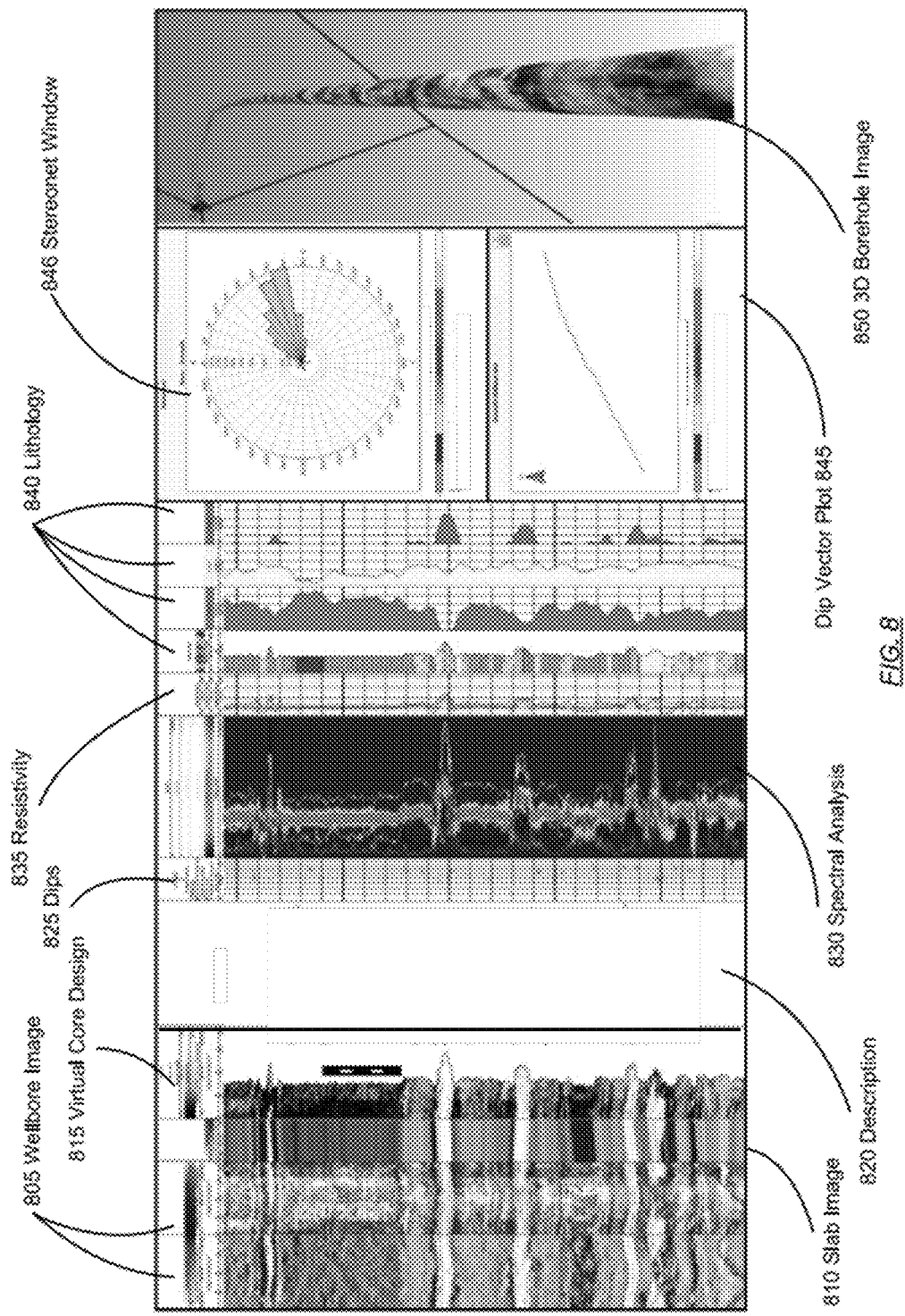
FIG. 8 shows an example presentation in accordance with one or more embodiments of the technology.

FIG. 8 is an example of data presentation in one or more embodiments. As seen in FIG. 8, the data presentation may include wellbore images (805) derived from interpolated wellbore image data (244) and a slab image (810) from slab image data (246), virtual core design (815) and description (820), dips (825), bedding azimuths, textural parameters shown by the shading of the virtual core design (815), spectral analysis (830), lithology (840), stereonet plots (846), dip vector plot (845), and a 3D wellbore image (850). The wellbore images (805) are derived from data (244, 246) generated by the interpolator (212). The lithology (840) and textural parameters derive from data generated by the quantifier (214).

In one or more embodiments, the data repository (240) is any type of storage unit and/or device (e.g., a file system, database, collection of tables, or any other storage mechanism) for storing data. Further, the data repository (240) may include multiple different storage units and/or devices. The multiple different storage units and/or devices may or may not be of the same type or located at the same physical site.

The data repository (240) includes functionality to store at least acquired data (242), interpolated wellbore image data (244), slab image data (246), quantification data (248), core characterization data (250), and design specifications (not shown) in accordance with one or more embodiments.

In one or more embodiments of the technology, acquired data (242) includes data derived from sidewall core samples as well as data measured by such well logging tools as spontaneous potential, natural gamma ray, including spectral gamma ray, density, neutron, acoustic, including ultrasonic, nuclear magnetic resonance, neutron-induced gamma ray spectroscopy, resistivity, including induction, and wellbore imaging.

In one or more embodiments, the user interface (225) is connected to the field control module (230), and may be configured to interact with a user. For example, the user interface (225) may be a graphical user interface (GUI). Further, the user interface (225) may include functionality to receive information about acquired data (242), interpolated wellbore image data (244), slab image data (246), quantification data (248), core characterization data (250), and/or various field operations. The user interface (225) may further be configured to display output of the virtual core generator (210), the field control module (230), or a combination thereof.

FIG. 3.1 is a schematic of a wellbore (300). Coring is the process of extracting subterranean formation matter and bringing it to the surface for examination and testing. This subterranean formation matter may include minerals in the form of rocks, hydrocarbon solids and fluids, and water. Two types of core are common in the oil and gas industry—whole core (320) and sidewall core (340).

Whole core (320) is created as the well is drilled with a special coring bit and is slightly smaller in diameter than the diameter of the wellbore. Conventional whole core (320) is a cylindrical sample of a portion of a subterranean formation and may be created during a coring operation with a special coring drill bit used in conjunction with a core barrel and a core catcher. The whole core (320) is generally coaxial with the wellbore. Considerations, including cost and time, often limit whole core (320) sampling to select intervals of the well.

A sidewall core (340) is another type of core. Once a wellbore (300) is created, a sidewall core (340) may be taken by drilling into the wellbore wall. Sidewall core (340) is also a cylindrical sample of a portion of a formation. Sidewall core (340) is typically smaller in diameter and shorter in length than a whole core (320) and is taken at discrete locations rather than over an interval. For these reasons, sidewall core (340) often provides a more limited understanding of the subterranean environment than does whole core (320). Sidewall core (340) is generally extracted using a wireline tool. Sidewall core (340) may be collected with different wireline tools including a percussion sidewall coring tool and a rotary sidewall coring tool. In one or more embodiments, the disclosed technology generates and presents data similar to that which could be generated and created by the observation and analysis of conventional whole core (320) without actually having taken any whole core from the wellbore (300). The disclosed technology may allow longer intervals of data along the wellbore to be analyzed than is typically possible through whole core (320) studies. This difference may be created by the relative expense and operation times of obtaining whole core (320) compared to the disclosed technology.

Keeping with FIG. 3.1, in one or more embodiments, data associated with the wellbore image (360) is acquired. In one or more embodiments, data associated with the wellbore image (360) is acquired by an electrical resistivity pad-type tool. A typical tool of this type may have numerous pads containing detectors. Pads are often attached to arms that extend to press the pads against the wellbore wall. Depending on the circumference of the wellbore, there may be gaps along the wellbore circumference in the coverage of acquired data. This is illustrated in FIG. 3.2. These figures are illustrative of concepts and are not to be limiting the disclosed technology in any way. In FIG. 3.2, the wellbore image (360) data acquired in a 3D wellbore environment may be visualized in a flattened data representation (380). As illustrated in FIG. 3.2, in one or more embodiments, the acquired wellbore image data (370) might not cover the entire circumference of the wellbore surface, leaving gaps. As discussed below, in, for example, Block 720 of FIG. 7, the disclosed technology may be used to generate interpolated wellbore image data (375) for the gaps. The number of interpolated wellbore image data (375) points relative to the number of acquired wellbore image data (370) points may vary.

Figure 4:
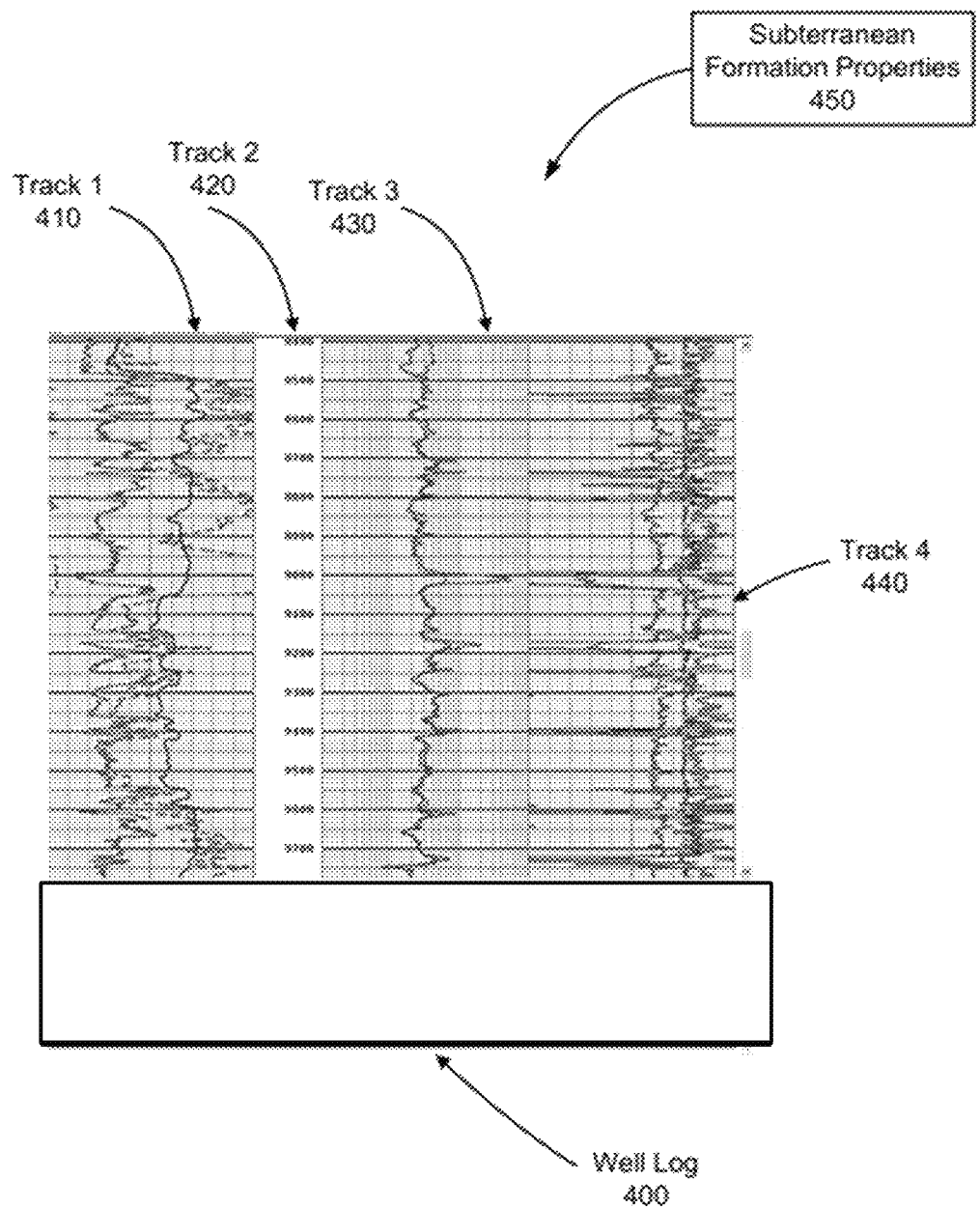
FIG. 4 shows an example of a well log in accordance with one or more embodiments of the technology.

Referring to FIG. 4, in one or more embodiments, a well log (400) displays subterranean formation properties (450). In one or more embodiments, the subterranean formation properties (450) are displayed as graphical data. In the illustrative example shown in FIG. 4, measurements of subterranean formation properties (450) are displayed in tracks 1, 3, and 4 (410, 430, and 440, respectively) as a function of position in the wellbore as displayed in track 2 (420), also referred to as a depth track. Position in the wellbore may be tied to measured depth (MD), true vertical depth (TVD), or other useful measures. In one or more embodiments, the well log (400) may display such subterranean formation properties (450) as wellbore caliper (CALI), spontaneous potential (SP), or gamma ray (GR) in track 1 (410), resistivity (ILD and SN) in track 3 (430), and acoustic slowness (DT) and density (RHOB) in track 4 (440). In one or more embodiments, data obtained with respect to one or more of these subterranean formation properties (450) and others not shown in FIG. 4 may be examples of acquired data in the disclosed technology.

Embodiments may be implemented on a computing system. Any combination of mobile, desktop, server, router, switch, embedded device, well logging tool, or other types of hardware may be used. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (507), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform at least a portion of one or more embodiments of the technology.

The computing system or group of computing systems described in FIGS. 5.1 and 5.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system (500) in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the technology, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 5.1 and the nodes and/or client device in FIG. 5.2. Other functions may be performed using one or more embodiments of the technology.

Figure 6:
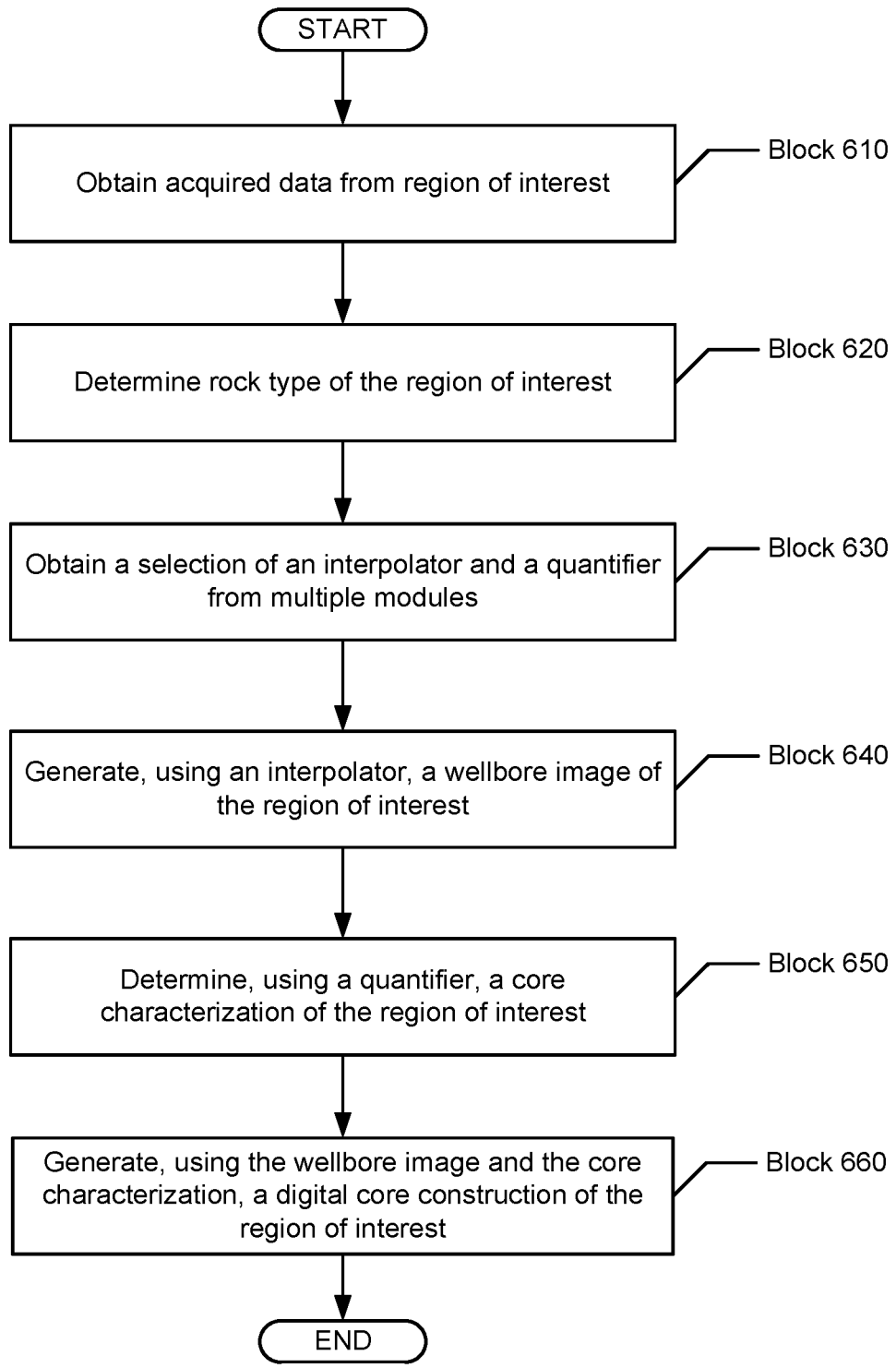
FIGS. 6 and 7 show flowcharts in accordance with one or more embodiments of the technology.
Figure 7:
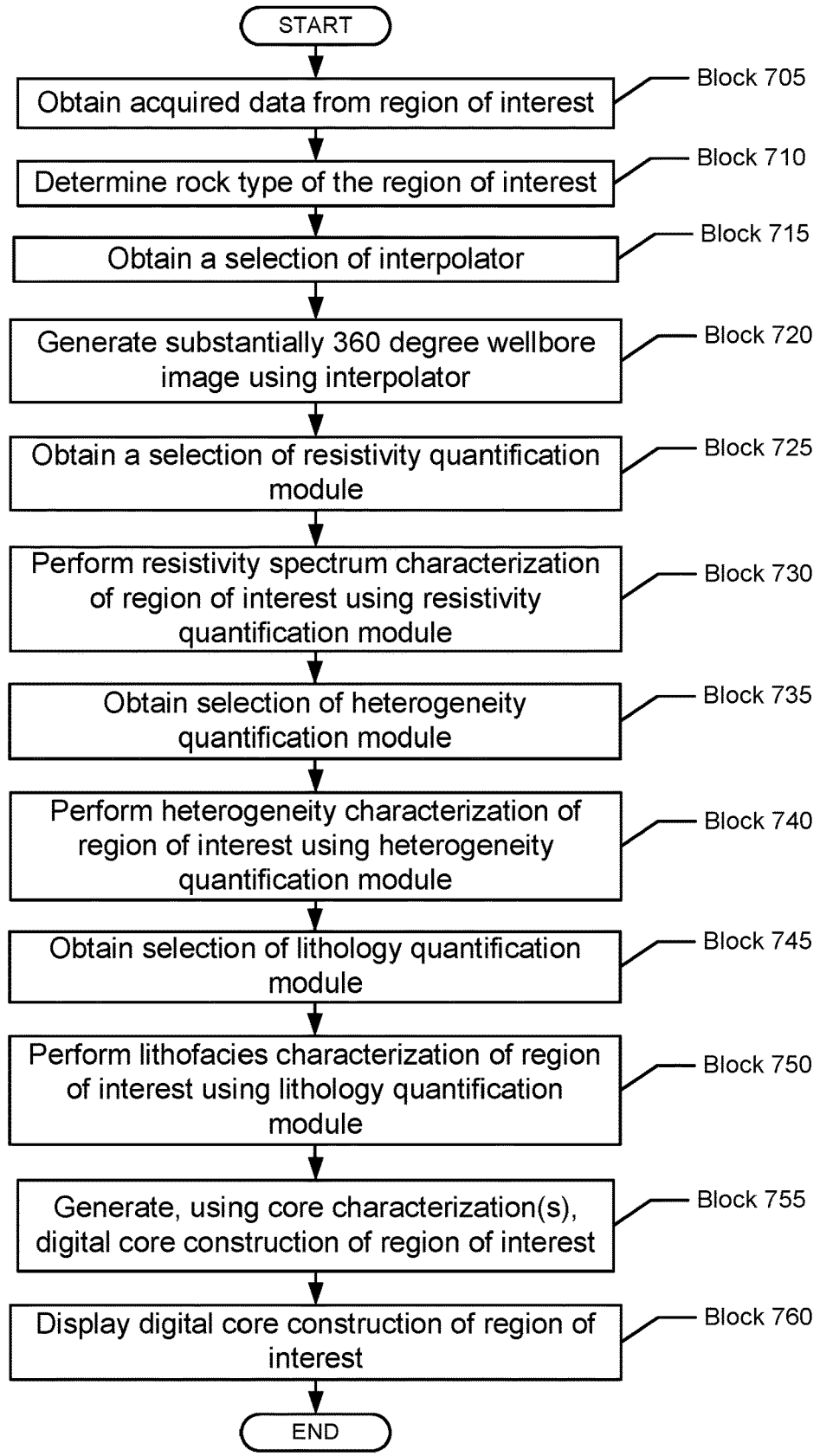

FIGS. 6 and 7 show flowcharts in accordance with one or more embodiments. The flowcharts present embodiments of a method for generating a digital core construction using multiple software modules. While the various blocks in these flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively.

Turning to FIG. 6, in Block 610, acquired data is obtained from a region of interest in accordance with one or more embodiments. In one or more embodiments, a region of interest is at least a portion of a well. In one or more embodiments, a region of interest is at least a portion of a field. In one or more embodiments, a region of interest is one or more sections of a well. These sections may be contiguous or not. In one or more embodiments, the acquired data is measured by well logging tools. In one or more embodiments, the well logging tools include wellbore imaging tools.

In Block 620, a rock type may be determined for the region of interest in accordance with one or more embodiments. In one or more embodiments, the determination may include considerations based on the acquired data obtained in Block 610. In one or more embodiments, the determination of a rock type may include considerations based on other factors or data, including but not limited to seismic data, geological analogs, and outcrops. In one or more embodiments, the rock type may be a clastic. In one or more embodiments, the rock type may be a siliciclastic. In one or more embodiments, the rock type may be a carbonate.

In Block 630, a selection of an interpolator and a quantifier is obtained from multiple modules in accordance with one or more embodiments. In one or more embodiments, the interpolator may be based on MPS theory.

In Block 640, an interpolator generates interpolated wellbore image data from acquired data obtained from the region of interest in accordance with one or more embodiments. In one or more embodiments, the interpolator may generate slab image data from the acquired data, the interpolated wellbore image data, or a combination thereof. In one or more embodiments, the interpolator may be used to fill in gaps between data acquired with pad-type tools. In one or more embodiments, the interpolator may be used to interpolate data at the location of one or more faulty detectors. Detectors may also be known as sensors or electrodes or buttons.

In Block 650, a quantifier is used to determine a core characterization of the region of interest in accordance with one or more embodiments. In one or more embodiments, the quantifier is used to generate quantification data from acquired data, interpolated wellbore image data, slab image data, or a combination thereof. In one or more embodiments, the core characterization includes at least textural analysis parameters, grain size sorting, heterogeneity analysis, or lithology analysis. The acquired data may include well logging data, which may include data from a wellbore imaging tool. The interpolated wellbore image data and the slab image data may be generated by an interpolator. The textural analysis parameters may be generated by resistivity spectrum analysis. The grain size sorting may be derived from an image sorting index generated by the resistivity spectrum analysis. The heterogeneity analysis may quantify the spatial distribution of resistive and conductive zones and the connectivity of these zones to obtain a wellbore heterogeneity. The lithology analysis may combine wellbore image data with other data acquired in well logging. In one or more embodiments, for example, the wellbore image data includes high-resolution data from a micro-resistivity imaging tool. In one or more embodiments, the other acquired data includes lithology data from a neutron-induced gamma ray spectroscopy tool, among others.

In Block 660, a digital core construction of the region of interest is generated using the wellbore image and the core characterization in accordance with one or more embodiments. For example, the digital core construction may be generated from the wellbore image in Block 640 and the core characterization in Block 650. In one or more embodiments, the digital core construction may include one or more of the following: a 360 degree wellbore image, a slab image, textural analysis parameters, grain size data, heterogeneity analysis, or lithology analysis.

Turning to FIG. 7, in Block 705, acquired data is obtained from the region of interest in accordance with one or more embodiments. The acquired data may be obtained in a manner similar to that discussed in Block 610 and the accompanying description.

In Block 710, a rock type of the region of interest is determined in accordance with one or more embodiments. The rock type of the region of interest may be determined in a manner similar to that discussed in Block 620 and the accompanying description.

In Block 715, a selection of an interpolator is obtained in accordance with one or more embodiments. In one or more embodiments, the selection may be an interpolator that generates substantially 360 degree wellbore image data from acquired data. In one or more embodiments, this data may have been acquired with a pad-type well logging tool that measures resistivity with one or more sensors on each of the at least one pads. In one or more embodiments, this data may have been acquired in water-base mud. In one or more embodiments, this data may have been acquired in oil-base mud. In one or more embodiments, this data may have been acquired in synthetic-base mud. In one or more embodiments, this data may have been acquired using an ultrasonic imaging tool.

In one or more embodiments, the selection may be an interpolator that creates a slab view of the subterranean formation removed from interior of the wellbore during drilling. The slab view may be similar to images obtained by a cross-sectional cut through a conventional whole core. In one or more embodiments, the slab view may be generated by using geometrical relationships between the data from the wellbore surface and the plane of the slab, or section. In one or more embodiments, the data from the wellbore surface may be acquired data, interpolated data, or a combination of the two. In one or more embodiments, this module allows the projection of bedding and feature planes on a slab-oriented plane defined by the user. Data from these interpolators may be continuous for the logged interval as opposed to conventional, or physical, whole core that may be reduced to a limited interval.

In Block 720, a substantially 360 degree wellbore image is created using an interpolator in accordance with one or more embodiments. The interpolator may generate the substantially 360 degree wellbore image using data acquired by a wellbore imaging tool. In one or more embodiments, the interpolator uses multiple-point statistics (MPS) to interpolate between acquired data points. In one or more embodiments, the interpolator generates interpolated wellbore image data points for sections of the wellbore wall that were not measured by sensors on a pad of a pad-type wellbore imaging tool.

In Block 725, a selection of a resistivity quantification module is obtained in accordance with one or more embodiments. In one or more embodiments, the resistivity quantification module is capable of analyzing resistivity/conductivity spatial distributions or spectra at each depth location in a wellbore to compute grain size, sorting and heterogeneity indices.

In Block 730, the resistivity quantification module may perform a resistivity spectrum characterization of the region of interest in accordance with one or more embodiments. In one or more embodiments, this characterization may include analyzing the resistivity distribution from calibrated electrical wellbore images through histogram and quantile analysis. In one or more embodiments, because the resistivity distribution in images in clastic formations may be related to textural parameters, the quantile values may be used to compute an image sorting index. In one or more embodiments, the image sorting index may have a relationship to grain size sorting. This image sorting index may be validated with data derived from core and from nuclear magnetic resonance logging measurements. In one or more embodiments, the quantitative descriptions of the resistivity distribution generated by the resistivity quantification module may provide a set of parameters that are commonly described in core description. In one or more embodiments, these parameters allow the definition of the different reservoir properties and sedimentological information.

In Block 735, a selection of a heterogeneity quantification module is obtained from a plurality of modules in accordance with one or more embodiments.

In Block 740, a heterogeneity characterization of the region of interest is performed using the heterogeneity quantification module in accordance with one or more embodiments. In one or more embodiments, the heterogeneity quantification module provides quantitative measures of such reservoir behavior as heterogeneity index and vug porosity (using acoustic tools). In one or more embodiments, with oil-base or synthetic-base mud images, and water based mud, the heterogeneity quantification module may be used to quantify the spatial distribution of resistive and conductive zones and the connectivity of the zones to obtain a representation of the wellbore heterogeneity. In one or more embodiments, the heterogeneity quantification module is applied to evaluate and use multiple types of heterogeneity during manual or automated facies/electrofacies description and prediction. In one or more embodiments, the heterogeneity quantification module works in multiple operations. In one or more embodiments, the heterogeneity quantification module may remove the background conductivity of the substantially 360 degree wellbore image generated by an interpolator. In one or more embodiments, to the heterogeneity quantification module may segment the substantially 360 degree wellbore image. In one or more embodiments, the segmenting is performed using a watershed transform. In one or more embodiments, is the heterogeneity quantification module extracts the conductive and resistive zones by using cutoffs. In one or more embodiments, the surface portion of each spot/heterogeneity category is computed and represented as a curve. Examples of heterogeneity categories include resistive and conductive.

In one or more embodiments, facies prediction uses heterogeneity analysis, mineralogy from cuttings and spectroscopy tools, and user input to create a consistent facies succession. In one or more embodiments, a neural network is used to make facies predictions.

In Block 745, a selection of a lithology quantification module is obtained from a plurality of modules in accordance with one or more embodiments.

In Block 750, the selected lithology quantification module is used to combine wellbore image data with other well log data to quantify petrographic and petrophysical parameters such as lithology at high resolution in accordance with one or more embodiments. In one or more embodiments, the well log data includes neutron-induced gamma-ray spectroscopy data. In one or more embodiments, the lithology data includes dry weight measures of such minerals categories as clay (e.g., WCLA), quartz-feldspar-mica (e.g., WQFM), and carbonate (e.g., WCAR). Other mineral categories or combinations of categories could also be used. In one or more embodiments, a projection, using clay, quart-feldspar-mica, and carbonate as endpoints in a ternary diagram, gives different lithology classes such as Marl, Claystone, Shale, Sandy Shale, Shale Sand, Sand, Clean Sand, Calcareous Sand, Calcareous Shale, Carbonate, Sandy Carbonate, and Shale Carbonate. In one or more embodiments, the spatial resolution of the delineation of the lithology is increased by combining the lithology data with high-resolution resistivity data from micro-resistivity images.

In Block 755, a digital core construction of the region of interest is generated using core characterization in accordance with one or more embodiments. The digital core construction of the region of interest may be generated in a manner similar to that discussed in Block 660 and the accompanying description.

In Block 760, a digital core construction of the region of interest is displayed in accordance with one or more embodiments. In one or more embodiments, the display is in a well log format. In one or more embodiments, the well log format is a core description-like display. In one or more embodiments, the display is similar to the composite display shown in FIG. 8. As seen in FIG. 8, the display includes a substantially 360 degree wellbore image. In one or more embodiments, this substantially 360 degree wellbore image includes both acquired and interpolated data. Continuing with FIG. 8, one or more embodiments includes a slab image of the digital core construction. The display may include digital core design and description, wellbore images (805), slab image (810), annotation (820) containing geological descriptions, dips (825), resistivity (835), bedding azimuths, textural parameters, lithology (840), stereonet plots (845), dip vector plot and a 3D wellbore image (850). In one or more embodiments, the display may be a log printed on paper. In one or more embodiments, the display may be presented on a monitor or some other output device (507) for a computing system (500) similar to that shown in FIG. 5.1.

In one or more embodiments, the output of the virtual core generator is validated by and, in some cases, calibrated to any physical core data that may be available. This core data may be from conventional whole core from sections of the wellbore or sidewall core taken at discrete locations in the wellbore wall. In one or more embodiments, the output of the virtual core generator is used to aid in the selection of locations to sample sidewall core.

The disclosed technology may be combined with sidewall core, and particularly large-volume sidewall core, to allow the construction of a viable substitute for conventional whole core. Large rotary sidewall core samples with approximate dimensions of 2.5 inches in length and 1.5 inches in diameter, the same dimensions as conventional core plugs, would be especially usefulness. Cores of this size would provide more than enough rock for routine core analysis, tight rock analysis, and special core analysis. This size would also be ideal for relative permeability studies and advance geomechanics analysis.

Figure 9:
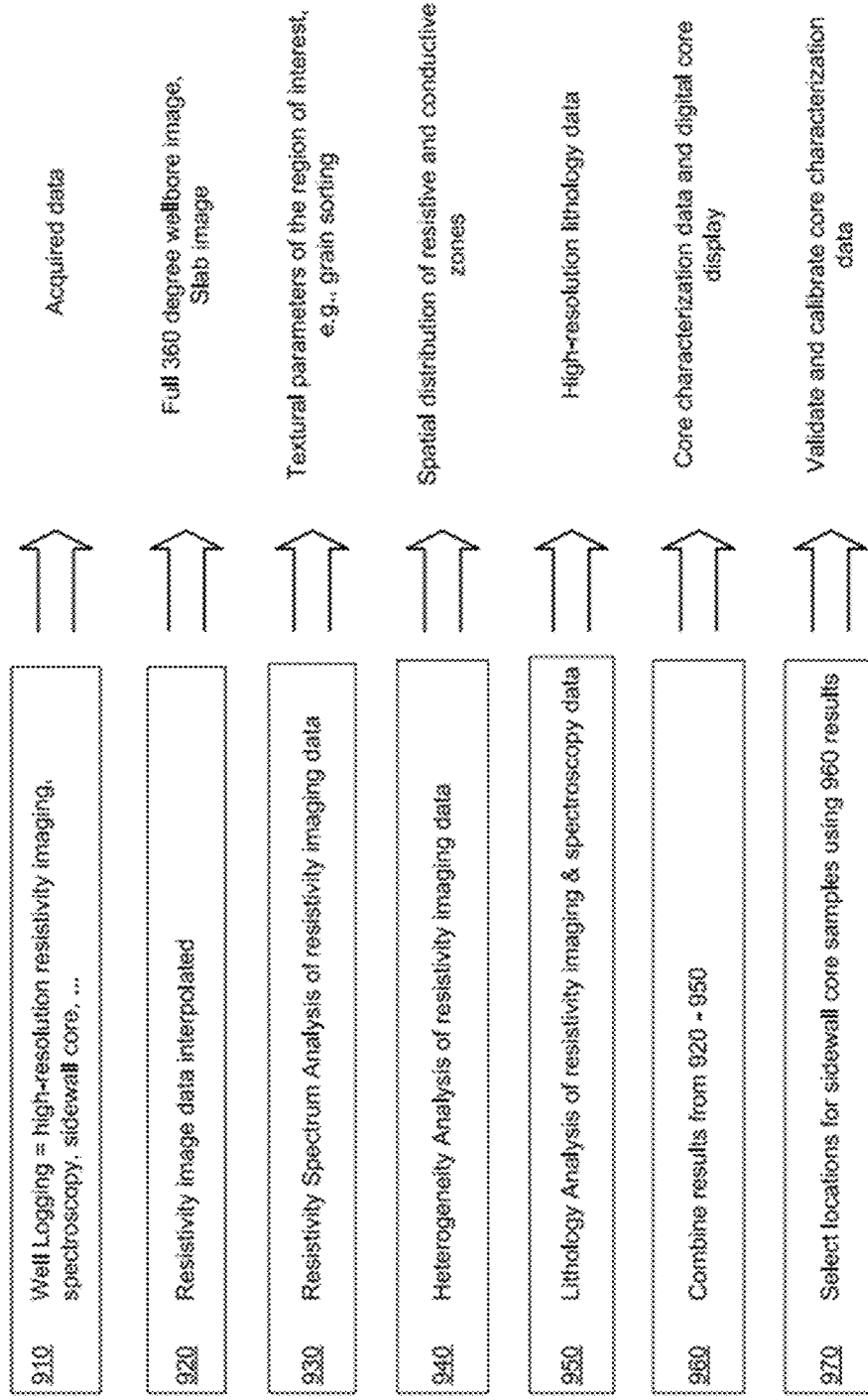
FIG. 9 shows an example in accordance with one or more embodiments of the technology.

FIG. 9 provides an example of generating and displaying a digital core construction of a region of interest. The following example is for explanatory purposes and not intended to limit the scope of the technology.

In this example, XYZ Oil Company owns mineral rights to a geographic area that may include a hydrocarbon reservoir. XYZ decides to drill an exploration well to determine whether a hydrocarbon reservoir is present. The drilling fluid selected is an oil-base mud. To gather additional data about the subterranean formation, XYZ selects an oilfield services company to provide wireline logging services. Some of the wireline logging services (910) to be provided include neutron-induced gamma-ray spectroscopy, high-resolution resistivity imaging, and large-volume rotary sidewall coring.

Following the drilling operations for the portion of the well covering the region of interest, the wireline logging is done in one or more runs. Because the diameter of the wellbore is sufficiently large, the high-resolution resistivity imaging tool may extend electrode-containing pads in order to make contact with the wellbore wall. Thus, the acquired resistivity imaging data may not cover the entire circumference of the wellbore but may have gaps between the pads.

Using the acquired resistivity imaging data, an interpolator (920) generates a substantially 360 degree image of the wellbore surface as a function of measured depth in the well. Using multi-point statistics theory, the module interpolates data between the pads. Using the substantially 360 degree image containing acquired and interpolated data, the interpolator generates a slab image, showing the equivalent of a cross-sectional cut across a physical conventional whole core.

Next, the resistivity spectrum of the resistivity imaging data is analyzed (930) to determine such textural parameters of the subterranean formation as grain size sorting. Heterogeneity analysis (940) is performed on the resistivity imaging data, providing a spatial distribution of resistive and conductive zones and the connectivity of the zones, thus generating a representation of wellbore heterogeneity.

Then high-resolution resistivity-imaging data is combined with lithology data from a neutron-induced gamma-ray spectroscopy tool in the quantifier to generate a high-resolution lithology log (950).

The results generated through interpolating resistivity image data (920), resistivity spectrum analysis (930), heterogeneity analysis (940), and lithology analysis (950) are combined (960) to produce core characterization data and a digital core display similar to the one shown in FIG. 8.

With this digital core, XYZ may select (970) locations for sampling large-volume rotary sidewall core. These core samples, once taken and analyzed, may provide validation and calibration for the core characterization data and digital core display derived from the logging data.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims.

While the technology has been described with respect to a limited number of embodiments, those skilled in the art, having benefit of this disclosure, will appreciate that other embodiments may be devised which do not depart from the scope of the technology as disclosed herein. Accordingly, the scope of the technology should be limited by the attached claims.

What is claimed is:

1. A method, comprising:
   executing, via a processor, instructions stored on memory, to perform:
   obtaining acquired data for a region of interest, wherein the acquired data is obtained from samples captured at discrete locations along a sidewall of a wellbore;
   determining a rock type of the region of interest;
   obtaining a selection of a plurality of modules based on the rock type;
   generating, using the acquired data and an interpolator from the plurality of modules, a wellbore image of the region of interest, wherein the interpolator generates interpolated data for gaps in data acquisition between the discrete locations in the acquired data in the wellbore image;
   generating a slab image of the region of interest using:
   the acquired data including the samples captured at the discrete locations along the sidewall of the wellbore, and
   the interpolator from the plurality of modules, wherein the interpolator uses the interpolated data to generate the slab image indicating a slice transecting the interpolated data at two points of the slab image;
   determining, using a quantifier from the plurality of modules, a core characterization of the region of interest, wherein the core characterization describes an integration of a plurality of wellbore data types;
   using the quantifier to generate quantification data from the acquired data, the wellbore image, and the slab image;
   performing a plurality of analyses using the quantification data to define the plurality of wellbore data types, wherein the plurality of analyses includes at least one of textural analysis, grain size sorting, heterogeneity analysis or lithology analysis;
   generating, using the core characterization, the wellbore image, the slab image, and the plurality of analyses, a digital core construction of the region of interest, wherein the digital core construction describes a plurality of subterranean formation properties of the region of interest, and the digital core construction comprises a substantially 360 degree image of a wellbore surface, as a function of depth in a well, of at least a portion of the region of interest;
   using the digital core construction of the region of interest to
   select locations to obtain a large-volume sidewall core sample of the wellbore by drilling into the sidewall of the wellbore to acquire a portion of a formation of the region of interest; and
   sample the large-volume sidewall core sample from the portion of the formation of the region of interest, wherein the large-volume sidewall core sample has a size with a minimum dimension of at least 1.5 inches in diameter and length; and
   validating and calibrating both the core characterization and the digital core construction using physical core data from analysis of the large-volume sidewall core sample by using the physical core data to validate and calibrate at least one of the acquired data, the interpolated data for the gaps in data acquisition between the discrete locations in the acquired data, the slab image, or the quantification data.

2. The method of claim 1, wherein the core characterization of the region of interest comprises a facies prediction comprising a classification of rock units by geological features of the region of interest.

3. The method of claim 1,
wherein the wellbore image comprises a 360 degree view of the wellbore surface with acquired data points located at a first predetermined interval,
wherein the digital core construction comprises a 360 degree view of the wellbore surface with digital data points located at a second predetermined interval, and
wherein the second predetermined interval is less than the first predetermined interval.

4. The method of claim 1,
wherein obtaining the selection of the plurality of modules comprises obtaining a user input via a user interface, and
wherein the user input designates a type of interpolator among the plurality of modules and a type of quantifier among the plurality of modules.

5. The method of claim 1,
wherein obtaining the selection of the plurality of modules is performed without user input, and
wherein the selection designates a type of interpolator among the plurality of modules and a type of quantifier among the plurality of modules.

6. The method of claim 1, wherein the quantifier performs a resistivity spectrum analysis to produce a resistivity distribution in the core characterization.

7. The method of claim 1, wherein generating the wellbore image comprises interpolating, by a statistical approach of the interpolator, one or more interpolated wellbore image points between a pair of acquired wellbore image points from the wellbore image.

8. The method of claim 1, wherein the plurality of subterranean formation properties of the region of interest comprise at least one property selected from a group consisting of: resistivity, density, porosity, and grain size distribution.

9. The method of claim 1, further comprising:
displaying, with a computing device, the digital core construction of the region of interest alongside the plurality of subterranean formation properties of the region of interest.

10. The method of claim 1,
wherein the region of interest corresponds to an oil or gas well, and
wherein the acquired data correspond to a plurality of measurements of the region of interest acquired using a wellbore imaging tool.

11. A system, comprising:
a data repository configured to store acquired data; a computer processor; and
a memory, coupled to the data repository and the computer processor, the memory storing instructions executed by the computer processor, wherein the instructions comprise functionality to:
obtain acquired data for a region of interest, wherein the acquired data is obtained from samples captured at discrete locations along a sidewall of a wellbore;
determine a rock type of the region of interest;
obtain a selection of a plurality of modules based on the rock type;
generate, using the plurality of modules, a wellbore image of the region of interest, wherein the interpolator generates interpolated data for gaps in data acquisition between the discrete locations in the acquired data in the wellbore image;
generate a slab image of the region of interest using:
the acquired data including data associated with the samples taken at the discrete locations along the sidewall of the wellbore, and
the interpolator from the plurality of modules, wherein the interpolator uses the interpolated data to generate the slab image indicating a slice transecting the interpolated data at two points of the slab image;
determine, using a quantifier from the plurality of modules, a core characterization of the region of interest, wherein the core characterization describes an integration of a plurality of wellbore data types;
use the quantifier to generate quantification data from the acquired data, the wellbore image, and the slab image;
perform a plurality of analyses using the quantification data to define the plurality of wellbore data types, wherein the plurality of analyses includes at least one of textural analysis, grain size sorting, heterogeneity analysis or lithology analysis;
generate, using the core characterization, the wellbore image, the slab image, and the plurality of analyses, a digital core construction of the region of interest, wherein the digital core construction describes a plurality of subterranean formation properties of the region of interest, and the digital core construction comprises a substantially 360 degree image of a wellbore surface, as a function of depth in a well, of at least a portion of the region of interest;
use the digital core construction of the region of interest to:
select locations to obtain a large-volume sidewall core sample of the wellbore by drilling into the sidewall of the wellbore to acquire a portion of a formation of the region of interest; and
sample the large-volume sidewall core sample from the portion of the formation of the region of interest, wherein the large-volume sidewall core sample has a size with a minimum dimension of at least 1.5 inches in diameter and length; and
validate and calibrate both the core characterization and the digital core construction using physical core data from analysis of the large-volume sidewall core sample by using the physical core data to validate and calibrate at least one of the acquired data, the interpolated data for the gaps in data acquisition between the discrete locations in the acquired data, the slab image, or the quantification data.

12. The system of claim 11, wherein the core characterization of the region of interest comprises a facies prediction comprising a classification of rock units by geological features of the region of interest.

13. The system of claim 11,
wherein the wellbore image comprises a 360 degree view of the wellbore surface with acquired data points located at a first predetermined sampling interval,
wherein the digital core construction comprises a 360 degree view of the wellbore surface with digital data points located at a second predetermined interval, and wherein the second predetermined interval is less than the first predetermined sampling interval.

14. The system of claim 11,
wherein obtaining the selection of the plurality of modules comprises obtaining a user input via a user interface, and
wherein the user input designates a type of interpolator among the plurality of modules and a type of quantifier among the plurality of modules.

15. The system of claim 11,
wherein obtaining the selection of the plurality of modules is performed without user input, and
wherein the selection designates a type of interpolator among the plurality of modules and a type of quantifier among the plurality of modules.

16. A non-transitory computer readable medium storing instructions for connecting a plurality of networks, the instructions, when executed by a computer processor, comprising functionality for:
obtaining acquired data for a region of interest, wherein the acquired data is obtained from samples captured at discrete locations along a sidewall of a wellbore;
determining a rock type of the region of interest;
obtaining a selection of a plurality of modules based on the rock type;
generating, using the acquired data and an interpolator from the plurality of modules, a wellbore image of the reg10n of interest, wherein the interpolator generates interpolated data for gaps in data acquisition between the discrete locations in the acquired data in the wellbore image;
generating a slab image of the region of interest using:
the acquired data including data associated with the samples taken at the discrete locations along the sidewall of the wellbore, and
the interpolator from the plurality of modules, wherein the interpolator uses the interpolated data to generate the slab image indicating a slice transecting the interpolated data at two points of the slab image;
determining, using a quantifier from the plurality of modules, a core characterization of the region of interest, wherein the core characterization describes an integration of a plurality of wellbore data types;
using the quantifier to generate quantification data from the acquired data, the wellbore image, and the slab image;
performing a plurality of analyses using the quantification data to define the plurality of wellbore data types, wherein the plurality of analyses includes at least one of textural analysis, grain size sorting, heterogeneity analysis or lithology analysis;
generating, using the core characterization, the wellbore image, the slab image and the plurality of analyses, a digital core construction of the region of interest, wherein the digital core construction describes a plurality of subterranean formation properties of the region of interest, and the digital core construction comprises a substantially 360 degree image of a wellbore surface, as a function of depth in a well, of at least a portion of the region of interest;
using the digital core construction of the region of interest to:
select locations to obtain a large-volume sidewall core sample of the wellbore by drilling into the sidewall of the wellbore to acquire a portion of a formation of the region of interest; and sample the large-volume sidewall core sample from the portion of the formation of the region of interest, wherein the large-volume sidewall core sample has a size with a minimum dimension of at least 1.5 inches in diameter and length; and
validating and calibrating both the core characterization and the digital core construction using physical core data from analysis of the large-volume sidewall core sample by using the physical core data to validate and calibrate at least one of the acquired data, the interpolated data for the gaps in data acquisition between the discrete locations in the acquired data, the slab image, or the quantification data.

17. The non-transitory computer readable medium of claim 16, wherein the core characterization of the region of interest comprises a facies prediction comprising a classification of rock units by geological features of the region of interest.

18. The non-transitory computer readable medium of claim 16,
wherein the wellbore image comprises a 360 degree view of the wellbore surface with acquired data points located at a first predetermined sampling interval,
wherein the digital core construction comprises a 360 degree view of the wellbore surface with digital data points located at a second predetermined interval, and
wherein the second predetermined interval is less than the first predetermined sampling interval.

19. The non-transitory computer readable medium of claim 16,
wherein obtaining the selection of the plurality of modules comprises obtaining a user input via a user interface, and
wherein the user input designates a type of interpolator among the plurality of modules and a type of quantifier among the plurality of modules.

20. The non-transitory computer readable medium of claim 16,
wherein obtaining the selection of the plurality of modules is performed without user input, and
wherein the selection designates a type of interpolator among the plurality of modules and a type of quantifier among the plurality of modules.

21. The method of claim 1, wherein the at least a portion of the region of interest is at a given measured depth or within a measured depth interval in the wellbore.

22. The method of claim 1, wherein the validating and calibrating comprises validating and calibrating the core characterization using the physical core data from the analysis of the large-volume sidewall core sample by using the physical core data to validate and calibrate each of the acquired data, the interpolated data for the gaps in data acquisition between the discrete locations in the acquired data, the slab image, and the quantification data.

23. The system of claim 11, wherein the at least a portion of the region of interest is at a given measured depth or within a measured depth interval in the wellbore.

24. The system of claim 11, wherein the instructions comprising functionality to validate and calibrate are configured to validate and calibrate the core characterization using the physical core data from the analysis of the large-volume sidewall core sample by using the physical core data to validate and calibrate at least the interpolated data for the gaps in data acquisition between the discrete locations in the acquired data.

25. The non-transitory computer readable medium of claim 16, wherein the at least a portion of the region of interest is at a given measured depth or within a measured depth interval in the wellbore.

26. The non-transitory computer readable medium of claim 16, wherein validating and calibrating comprises validating and calibrating the core characterization using the physical core data from the analysis of the large-volume sidewall core sample by using the physical core data to validate and calibrate at least the interpolated data for the gaps in data acquisition between the discrete locations in the acquired data.

* * * * *